(12) United States Patent
Klesing et al.

(10) Patent No.: US 10,737,718 B2
(45) Date of Patent: Aug. 11, 2020

(54) STEERING CONTROL SYSTEM AND METHOD FOR AUTONOMOUS VEHICLE

(71) Applicant: STEERING SOLUTIONS IP HOLDING CORPORATION, Saginaw, MI (US)

(72) Inventors: Joachim J. Klesing, Rochester, MI (US); Pierre C. Longuemare, Paris (FR); Salaheddine Safour, Massy (FR)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 15/916,993

(22) Filed: Mar. 9, 2018

(65) Prior Publication Data

US 2018/0257702 A1 Sep. 13, 2018

Related U.S. Application Data

(60) Provisional application No. 62/469,867, filed on Mar. 10, 2017.

(51) Int. Cl.
*B62D 6/00* (2006.01)
*B62D 1/28* (2006.01)
*B62D 15/02* (2006.01)
*B60W 50/08* (2020.01)
*B60W 50/12* (2012.01)
*G05D 1/00* (2006.01)

(52) U.S. Cl.
CPC .......... *B62D 6/007* (2013.01); *B60W 50/087* (2013.01); *B60W 50/12* (2013.01); *B62D 1/286* (2013.01); *B62D 15/025* (2013.01); *G05D 1/0061* (2013.01); *G05D 1/0088* (2013.01); *G05D 2201/0213* (2013.01)

(58) Field of Classification Search
None
See application file for complete search history.

(56) References Cited

U.S. PATENT DOCUMENTS 5,469,356 A * 11/1995 Hawkins ................ G01C 21/26
318/591
7,894,951 B2 * 2/2011 Norris ..................... H04L 67/12
180/443

(Continued)

FOREIGN PATENT DOCUMENTS

CN 104583057 A 4/2015
CN 105984485 A 10/2016

(Continued)

OTHER PUBLICATIONS

English translation of Office Action regarding related CN App. No. 201810196017.7, dated Mar. 26, 2020.

*Primary Examiner* — Abdhesh K Jha
(74) *Attorney, Agent, or Firm* — Dickinson Wright PLLC

(57) ABSTRACT

A steering control system for an autonomous or semi-autonomous vehicle includes a steering input device accessible to a driver for providing steering control of the vehicle in a manual steering mode. Also included is at least one autonomous steering assembly for providing steering control of the vehicle in an autonomous steering mode. Further included is a plurality of road wheels controlled by a blended output of the steering input device and the at least one autonomous steering assembly during a transition steering mode.

12 Claims, 4 Drawing Sheets

(56) References Cited

U.S. PATENT DOCUMENTS

| | | | |
|---|---|---|---|
| 9,342,074 B2 * | 5/2016 | Dolgov | B60W 30/00 |
| 9,720,411 B2 * | 8/2017 | Crombez | G05D 1/0088 |
| 10,289,113 B2 * | 5/2019 | Perkins | B60W 50/082 |
| 2012/0046817 A1 * | 2/2012 | Kindo | B60W 30/143 |
| | | | 701/23 |
| 2013/0002416 A1 * | 1/2013 | Gazit | B62D 1/28 |
| | | | 340/438 |
| 2016/0252903 A1 * | 9/2016 | Prokhorov | B60W 30/143 |
| | | | 701/23 |
| 2018/0164808 A1 * | 6/2018 | Prokhorov | B60W 50/08 |

FOREIGN PATENT DOCUMENTS

| | | | |
|---|---|---|---|
| CN | 105988467 A | | 10/2016 |
| CN | 106080745 A | | 11/2016 |
| JP | H10309961 | * | 5/1997 .... B60W 2050/0096 |

* cited by examiner

STEERING CONTROL SYSTEM AND METHOD FOR AUTONOMOUS VEHICLE

CROSS REFERENCE TO RELATED APPLICATION

This patent application claims priority to U.S. Provisional Patent Application Ser. No. 62/469,867, filed Mar. 10, 2017, which is incorporated herein by reference in its entirety.

BACKGROUND

The present application generally relates to steering systems used for driving a vehicle and, more particularly, to steering systems equipped in an autonomous vehicle.

Vehicles are being equipped for Level 3 and 4 autonomous functions. However, consumers may also want to drive vehicles by themselves at times. Accordingly, it is desirable to safely and intuitively manage a transition from autonomous driving mode into manual driving mode while driving.

SUMMARY

According to one aspect of the invention, a steering control system for an autonomous or semi-autonomous vehicle includes a steering input device accessible to a driver for providing steering control of the vehicle in a manual steering mode. Also included is at least one autonomous steering assembly for providing steering control of the vehicle in an autonomous steering mode. Further included is a plurality of road wheels controlled by a blended output of the steering input device and the at least one autonomous steering assembly during a transition steering mode.

According to another aspect of the invention, a method of transitioning from an autonomous steering mode to a manual steering mode for an autonomous or semi-autonomous vehicle is provided. The method includes controlling a plurality of road wheels with at least one autonomous steering assembly in the autonomous steering mode. The method also includes controlling the plurality of road wheels with a blended output of the at least one autonomous steering assembly and a steering input device operated by a driver during a transition steering mode.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
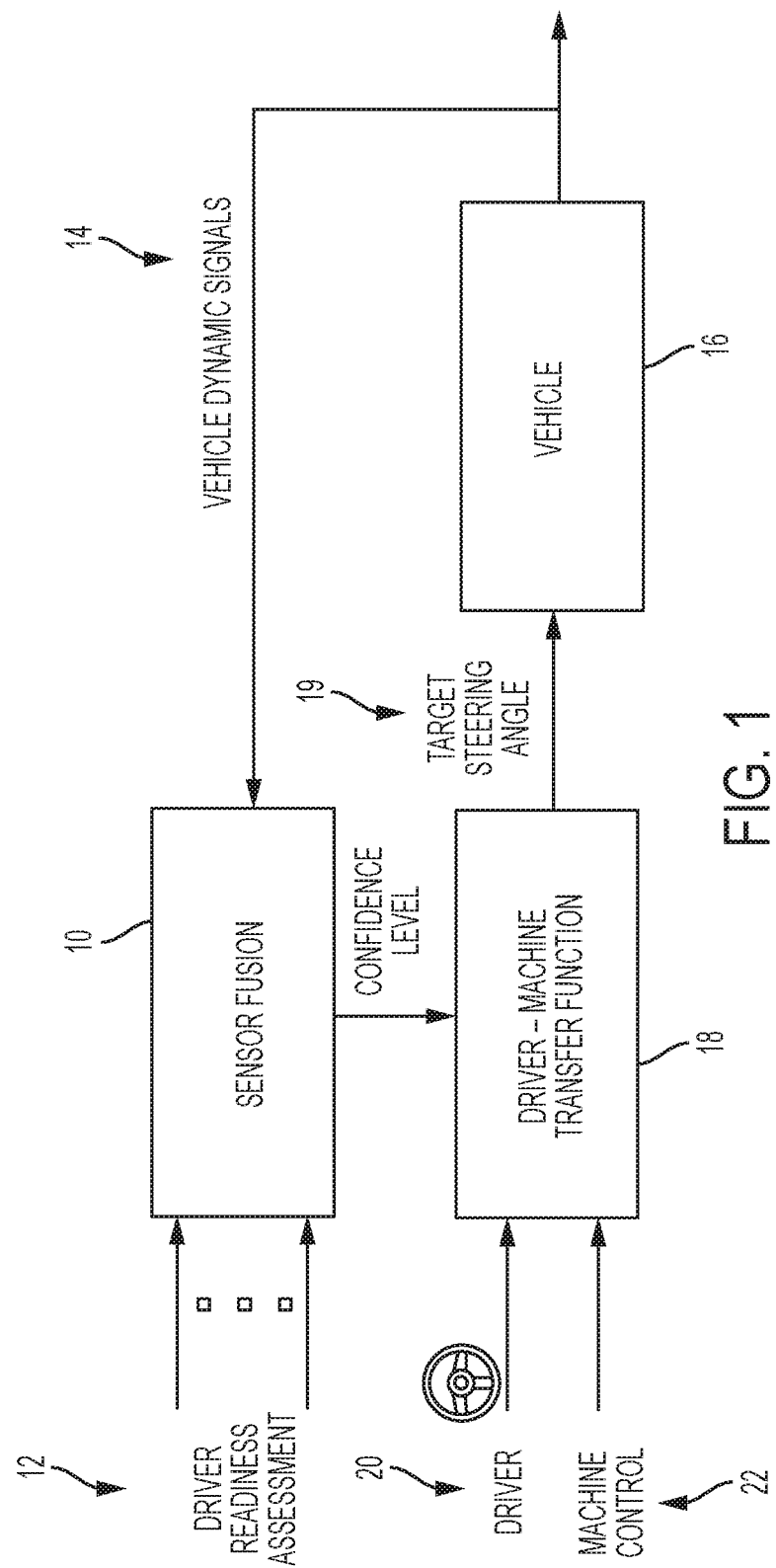
FIG. 1 is a block diagram illustrating a steering transition system for an autonomous vehicle.

FIG. 1 generally illustrates a system and method associated with a steering system of an autonomous vehicle. The steering system comprises a steer-by-wire assembly that electrically couples a steering input device (e.g., steering wheel) to a road wheel actuator. The autonomous vehicle is equipped for autonomous or semi-autonomous driving modes that include automatic steering that is controlled by one or more vehicle systems, such as Advanced Driving Assist Steering (ADAS), for example. The control system may include one or more controllers and processors that may be integrated with each other to store and receive data, process computations, and execute commands. In an autonomous steering mode, a driver is not required to provide steering control via the steering input device. In the event the driver desires to regain steering control of the vehicle, a prompt is submitted to transition the steering control back to the driver. Full driver steering control may be referred to as a manual steering mode of the vehicle.

Transitioning from the autonomous steering mode to the manual steering mode, in what is referred to as a transition steering mode, must be handled with many considerations in mind due to the dynamic factors associated with steering the vehicle. For example, consideration must be given to the angular position of the steering input device relative to an actual road wheel angular position. Furthermore, the speed of the vehicle impacts the transitioning. In addition to the physical characteristics of the vehicle, various road conditions may be analyzed to facilitate a safe transition. To execute a safe and intuitive transition from autonomous the autonomous steering mode to the manual steering mode, the embodiments described herein and illustrated in the Figures utilize a transfer function that determines if the transition mode may be safely completed to switch the vehicle to the manual steering mode. In some embodiments, the determination also considers safe and accurate assessment of driver intent and readiness to take over control. The interplay between the transfer function and the driver intent and readiness assessment is depicted in FIG. 1.

FIG. 1 schematically illustrates detection equipment 10, such as sensors, that receive input from a variety of components and/or systems. In the illustrated embodiment, the detection equipment receives input regarding driver readiness assessment information 12 and vehicle dynamic signals 14 generated by a vehicle 16. The detection equipment 10 processes the information and determines a confidence level that is representative of a computed appropriateness of transfer to the manual steering mode of the vehicle 16. The confidence level is input into a control module 18 programmed with a transfer function that tracks and controls an overall target steering angle 19 of the vehicle 16. The transfer function receives steering input 20 manually provided by the driver and machine control input from at least one autonomous steering assembly 22. The transfer function processes the received input and outputs the target steering angle 19 of the vehicle 16. As will be appreciated from the description herein, the transfer function 18 controls the transition steering mode to manage transitions from the autonomous steering mode to the manual steering mode.

Figure 2:
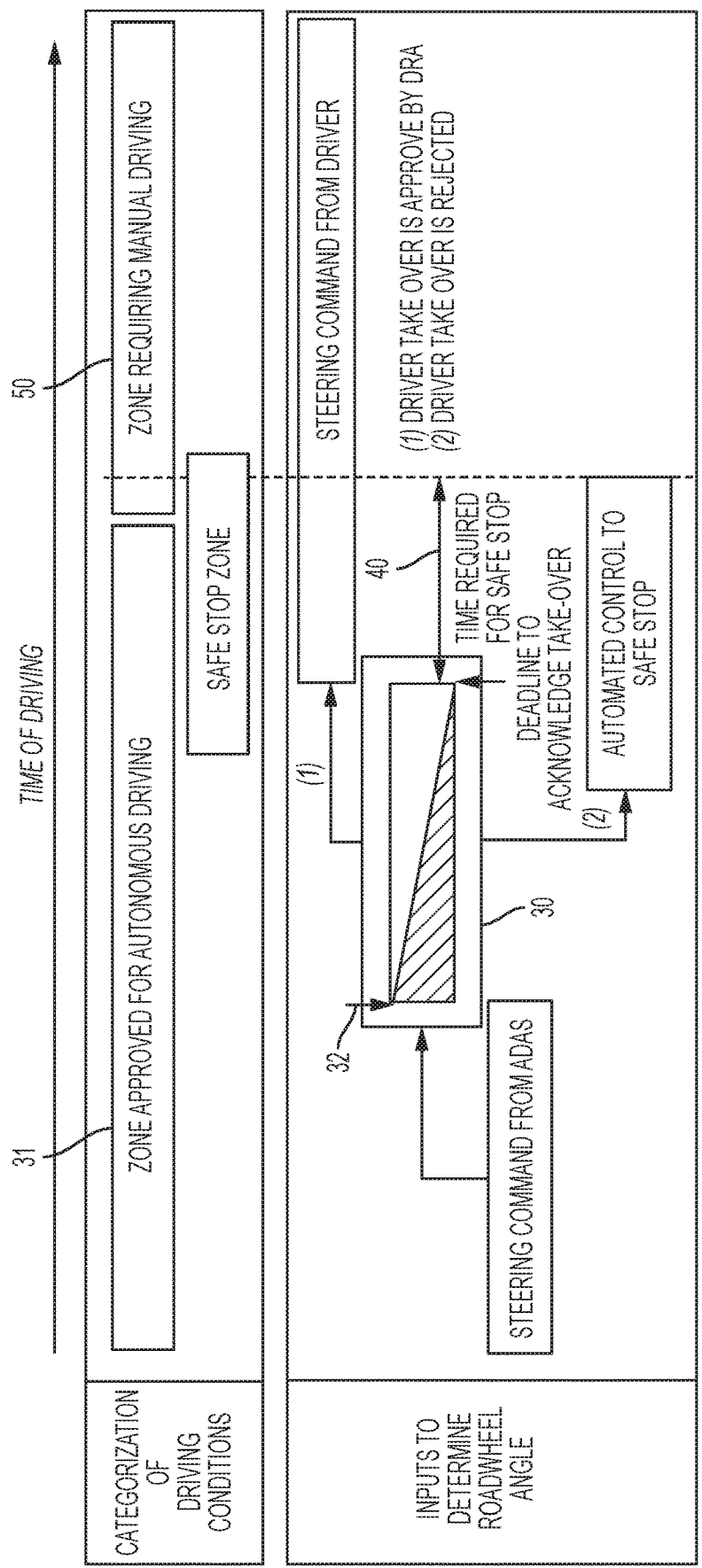
FIG. 2 is a diagram illustrating various steering control modes of the autonomous vehicle.

Referring now to FIG. 2, with the emergence of steer-by-wire, lateral control commands resulting from driver input and from an on-board path control system are fully independent and can be blended in order to gradually transition from the autonomous steering mode to the manual steering mode, and vice versa in some embodiments. The blended transition is defined by the illustrated progressive transition from the autonomous steering mode to the manual steering mode. As shown, the transition mode 30 is within a zone 31 approved for autonomous steering. Although illustrated as having a linear transition, it is to be understood that the blended transition mode will be non-linearly progressive. The disclosed transition mode that incorporates a blended transition will allow for a more intuitive operation of the vehicle under its various use cases, while guaranteeing functional safety and comfort.

The term "blended transition" is a progression of manual vehicle steering control that is increased during the transition mode. As illustrated, at the outset 32 of the transition mode, 0% of the total vehicle steering control is allotted to the driver. During the transition mode 30, the percentage of total vehicle steering control allocated to the driver is increased, while the autonomous steering assembly 22 steering control percentage is decreased. As discussed above, the increase may follow a linear slope, a non-linear curve or a combination thereof. During the transition mode 30, one or more steering control analysis systems—such as detection equipment 10 and/or control module 18 with transfer function—receives data related to the safety of the transition to the manual steering mode to evaluate whether completion of the transition to the manual steering mode is permissible. If the system(s) determines that the completion of the transition to the manual steering mode is not permissible, the system halts the transition by reverting to the autonomous steering mode or safely bringing the vehicle to a complete stop. As shown, a buffer zone 40 may be provided after completion of the transition mode 30 and prior to the zone 50 of driving that requires manual steering control. This buffer zone 40 is sufficient to safely stop the vehicle, if needed.

Figure 3:
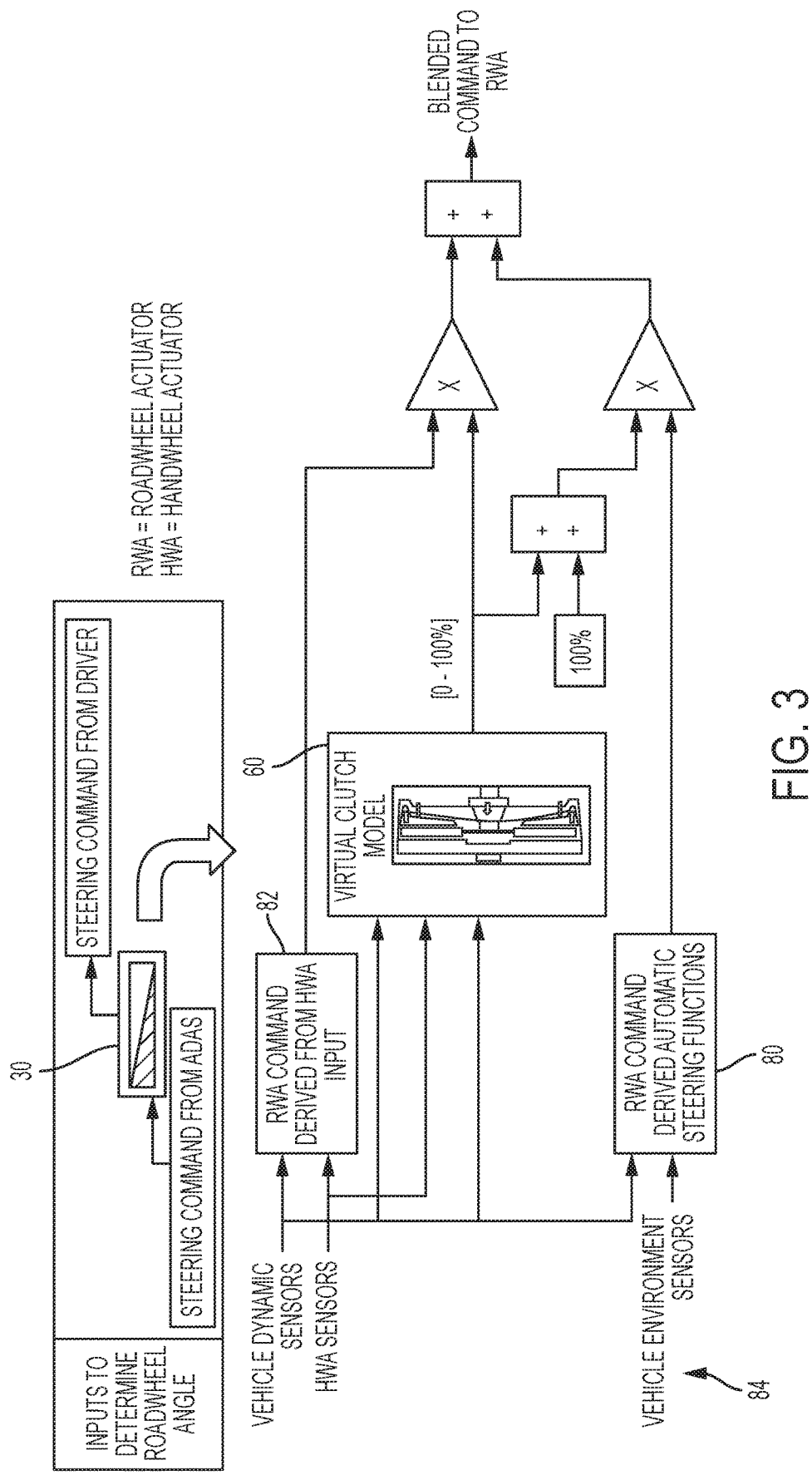
FIG. 3 schematically illustrates a transition steering mode within a control module according to an aspect of the disclosure.
Figure 4:
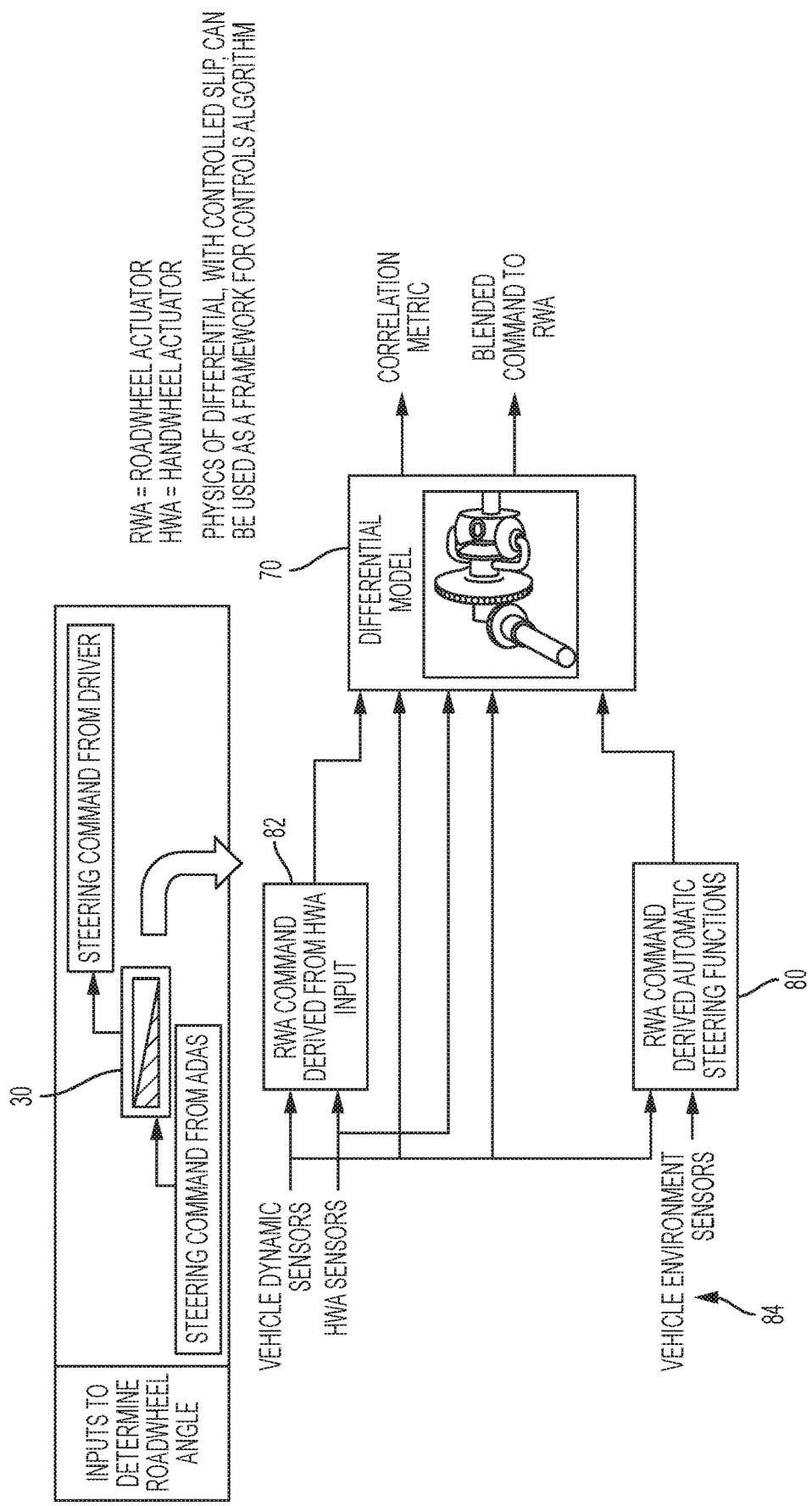
FIG. 4 schematically illustrates a transition steering mode contained within a control module according to another aspect of the disclosure.

Referring now to FIGS. 3 and 4, embodiments of control algorithms utilized with the transition mode 30 are illustrated schematically. As shown in each of FIGS. 3 and 4, the transition mode 30 of FIG. 2 is schematically illustrated. The algorithms are employed to convert the blended steering transition inputs from the driver and the autonomous system to a command output used to control the road wheels actuator. The embodiments employ respective algorithms that each comprise a transfer function that simulates the physical operation of a torque conversion device (e.g., a clutch, a differential or a planetary gear set) in order to control the angle command transmitted to the road wheel actuator based on two primary inputs. The algorithm employing a clutch model 60 is illustrated in FIG. 3 and the differential model 70 is illustrated in FIG. 4. The clutch model and the differential model refer to models that are determined by experimental data and physics associated with the clutch and differential, respectively.

The two primary inputs employed by the algorithms are steering command computed by an on-board path control system 80 and steering command resulting from actions of the driver on the steering input device 82 (e.g., steering wheel). Various sensors are employed to provide these inputs, including vehicle dynamic sensors, hand wheel actuator sensors, and vehicle environment sensors 84, for example. The algorithm primary output is the steering angle command and/or target lateral acceleration used to angulate the wheel of the vehicle. Based on other secondary inputs such as vehicle dynamics data and steering sensors, the algorithm will compute a virtual slippage metric that will be used to blend the two primary inputs during transition mode 30. It will also provide a measure of correlation between the inputs that can be used by a sensor fusion system assessing the readiness of a driver to assume manual control.

The embodiments disclosed herein provide for the transfer of authority from vehicle to driver with the help of a transfer function in a safe and intuitive manner.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering control system for an autonomous or semi-autonomous vehicle comprising:
    a steering input device accessible to a driver for providing steering control of the vehicle in a manual steering mode;
    at least one autonomous steering assembly for providing steering control of the vehicle in an autonomous steering mode; and
    a plurality of road wheels controlled by a blended output of the steering input device and the at least one autonomous steering assembly during a transition steering mode defined as a transition from the autonomous steering mode to the manual steering mode, wherein the blended output includes a target steering angle of the road wheels, the blended output determined by an algorithm stored within a control module that receives data from a plurality of sensors, wherein the transition steering mode ends prior to a zone required for the manual steering mode to define a buffer zone that provides enough time to safely stop the vehicle before the manual steering mode is required.

2. The steering control system of claim 1, wherein at least one of the sensors detects information related to at least one driver readiness condition.

3. The steering control system of claim 1, wherein at least one of the sensors detects vehicle dynamic signals.

4. The steering control system of claim 1, wherein at least one of the sensors detects vehicle environment conditions.

5. The steering control system of claim 1, the algorithm simulating a clutch.

6. The steering control system of claim 1, the algorithm simulating a differential.

7. The steering control system of claim 1, the algorithm simulating a planetary gear set.

8. A method of transitioning from an autonomous steering mode to a manual steering mode for an autonomous or semi-autonomous vehicle comprising:
    controlling a plurality of road wheels with at least one autonomous steering assembly in the autonomous steering mode;
    controlling the plurality of road wheels with a blended output of the at least one autonomous steering assembly and a steering input device operated by a driver during a transition steering mode defined as a transition from the autonomous steering mode to the manual steering mode, wherein the blended output is determined by an algorithm stored in a control module that receives data from a plurality of sensors; and
    terminating the transition mode prior to a zone required for manual steering to define a buffer zone that provides enough time to safely stop the vehicle before the manual steering mode is required.

9. The method of claim 8, wherein the control module receives data associated with at least one driver readiness condition.

10. The method of claim 8, wherein the algorithm receives data associated with vehicle dynamic signals.

11. The method of claim 8, wherein the algorithm receives data associated with vehicle environment conditions.

12. The method of claim 8, further comprising gradually increasing manual control of the total steering during the transition steering mode.

\* \* \* \* \*